INVENTORS
E. G. LANGLOIS
N. F. SMITH

By R. P. Miller
ATTORNEY

July 22, 1969 E. G. LANGLOIS ET AL 3,456,325

APPARATUS FOR INSERTING TERMINALS INTO NESTS IN ONE OR MORE BASE MEMBERS

Filed Dec. 8, 1966 7 Sheets-Sheet 2

United States Patent Office 3,456,325
Patented July 22, 1969

3,456,325
APPARATUS FOR INSERTING TERMINALS INTO NESTS IN ONE OR MORE BASE MEMBERS

Emile G. Langlois, Flemington, N.J., and Norman F. Smith, Methuen, Mass., assignors to Western Electric Company, Incorporated, New York, N.Y., a corporation of New York Filed Dec. 8, 1966, Ser. No. 600,220
Int. Cl. H01r 3/00
U.S. Cl. 29—203 9 Claims

ABSTRACT OF THE DISCLOSURE

Apparatus inserts terminals into nests in terminal blocks. Two inserters drive pairs of oppositely oriented terminals simultaneously into the nests. The blocks are filled sequentially, with the number of insertion strokes used for each block controlled to accommodate blocks with various numbers of nests. The last insertion stroke for each block drives either one or two terminals, dependent upon whether there is an odd or an even number of nests in the block. A counter, and a blocking lever associated with one of the inserters, control the total number of terminals inserted into each block.

This invention relates to apparatus for inserting terminals into nests in one or more base members, and more particularly to apparatus of the aforementioned type having provision for preventing the insertion of terminals into portions of a base member not intended as nests, and for interrupting the insertion of terminals during a substitution of an empty base member for a base member with terminals inserted in all of the nests therein.

In the manufacture of terminal block assemblies, the numbers of terminals to be inserted into different base members may vary from time to time, dependent upon the intended use of the finished product. Moreover, a configuration is often required wherein terminals having one orientation are alternatively positioned, with terminals having an opposed orientation interspersed therebetween. Thus, it is desirable to provide a single apparatus wherein terminals having opposed orientations are inserted in pairs. It is further desirable that such apparatus be operable upon different base members with different numbers of terminal nests therein, such numbers being either odd or even. It is, moreover, desirable to prevent the possibility of an attempted insertion of terminals into parts of base members not intended as nest positions.

It is, therefore, an object of the invention to provide new and improved apparatus for inserting terminals into nests in base members.

It is also an object of the invention to provide such apparatus wherein terminals having opposed orientations are inserted in pairs into nests in base members.

Another object of the invention is to provide an apparatus of this type wherein terminals may be inserted into base members having differing numbers, odd or even, of nests therein.

A further object is to prevent the insertion by such apparatus of terminals into parts of base members not intended as nest positions, or during the advance of an empty base member into position to receive the terminals.

With these and other objects in view, the invention contemplates a pusher mechanism having two pushers ordinarily simultaneously operated to push opposedly oriented terminals into aligned base member nests in pairs. An adjustably set counter registers each pair of insertions. If an odd number of nests are present in a base member, one of the pushers not having a nest aligned with it is blocked by a counter-controlled lever, preventing its operation, during a final insertion. After all nests in the base member are filled with terminals, a new base member is fed into position and an insertion clutch is disengaged to prevent any attempted insertion from occurring during feeding. Insertion may reoccur only upon a switch momentarily opening, then closing, indicating that a new, empty base member has been substituted for the filled base member.

Other advantages of the invention will be apparent from the following detailed description when considered in conjunction with the drawing, wherein.

Figure 4:
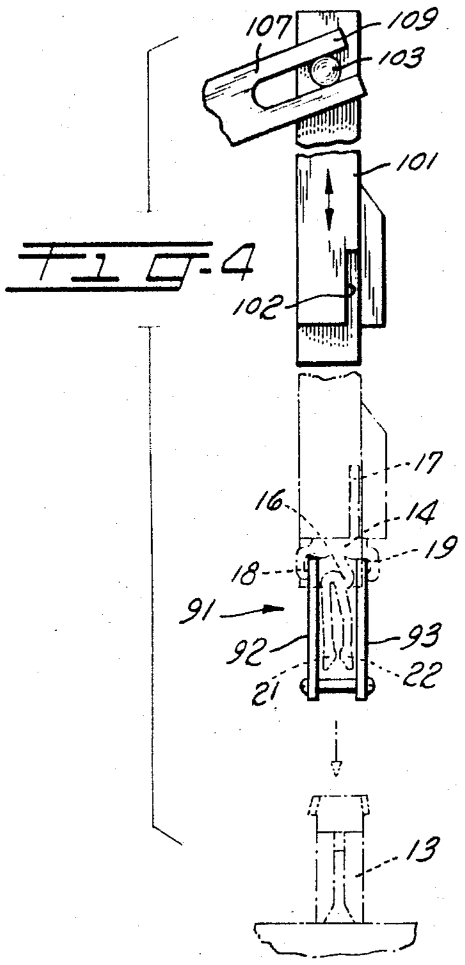
FIG. 4 is an end elevational view of the apparatus particularly showing a pusher or inserter blade, forming a part of the pusher mechanism.
Figure 6:
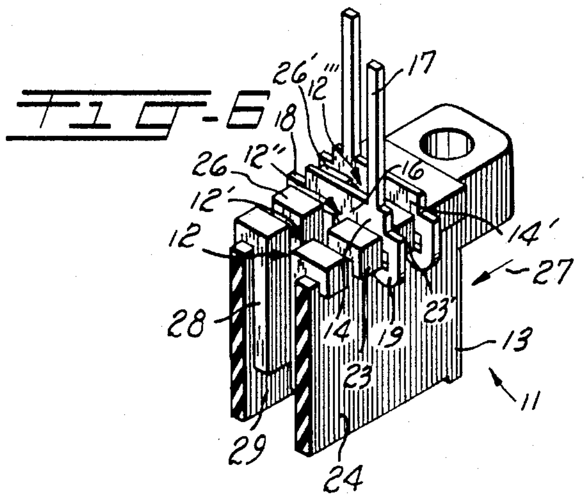
FIG. 6 is a perspective view of part of a base member having a pair of terminals inserted in nests therein.
Figure 7:
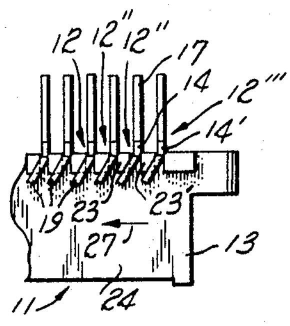
FIG. 7 is a side elevational view of part of a finished terminal block assembly.

Referring first to FIGS. 6 and 7, a portion of a typical terminal block 11 is illustrated. A plurality of nests 12, 12′, 12″, 12‴, etc. are located in a base member 13. Any number of nests, odd or even, may be present. In each of the nests there is located a terminal 14, 14′, etc. A typical terminal 14, best shown in FIG. 4, has a central body portion 16, from which a head member or tang 17 extends upwardly, two arms 18 and 19 extend outwardly and then downwardlly, and two legs 21 and 22 extend downwardly. The terminals are located in the base member 13 with alternate orientations. Note that, in FIG. 6, terminal 14 is located in nest 12″ with a first orientation, while terminal 14′ is located in nest 12‴ with a second, reversed orientation. A terminal located in nest 12′ would have an orientation similar to that of terminal 14′. A terminal located in nest 12 would have an orientation similar to that of terminal 14. This pattern of alternate orientations is continued for all the terminals in the base 13.

FIG. 7 best shows the way in which the terminals are retained in the base member 13. A plurality of protuberances 23, 23′, etc. (see also FIG. 6) project from the base member at both sides of each nest on the outer surface 24 of the base member 13 adjacent the arm 19 of terminal 14. A plurality of protuberances 26, 26′, are similarly located on the opposite outer surface of the base member 13. The arm 19 of terminal 14 is bent in one direction, as in the direction of arrow 27, while the arm 18 is bent in an opposite direction. The arm 19 is, thus, bent about and retained by the bottom surface of the protuberance 23, while the arm 18 is similarly retained by the bottom surface of a protuberance on the opposite outer surface of base member 13. Upward dislocation of the terminal 14 is, therefore, prevented. Each other terminal is similarly retained. Each of the terminals is supported in an associated nest by a bottom surface of the body portion 16. Associated with each protuberance 23, 23', 26, 26', etc. is a protuberance 28 on an inner, nest-defining surface 29 of the base 13. The protuberances 28 act to limit pivotal movement of the legs 21 and 22 of a terminal about the bottom surface of the body portion 16.

Figure 1:
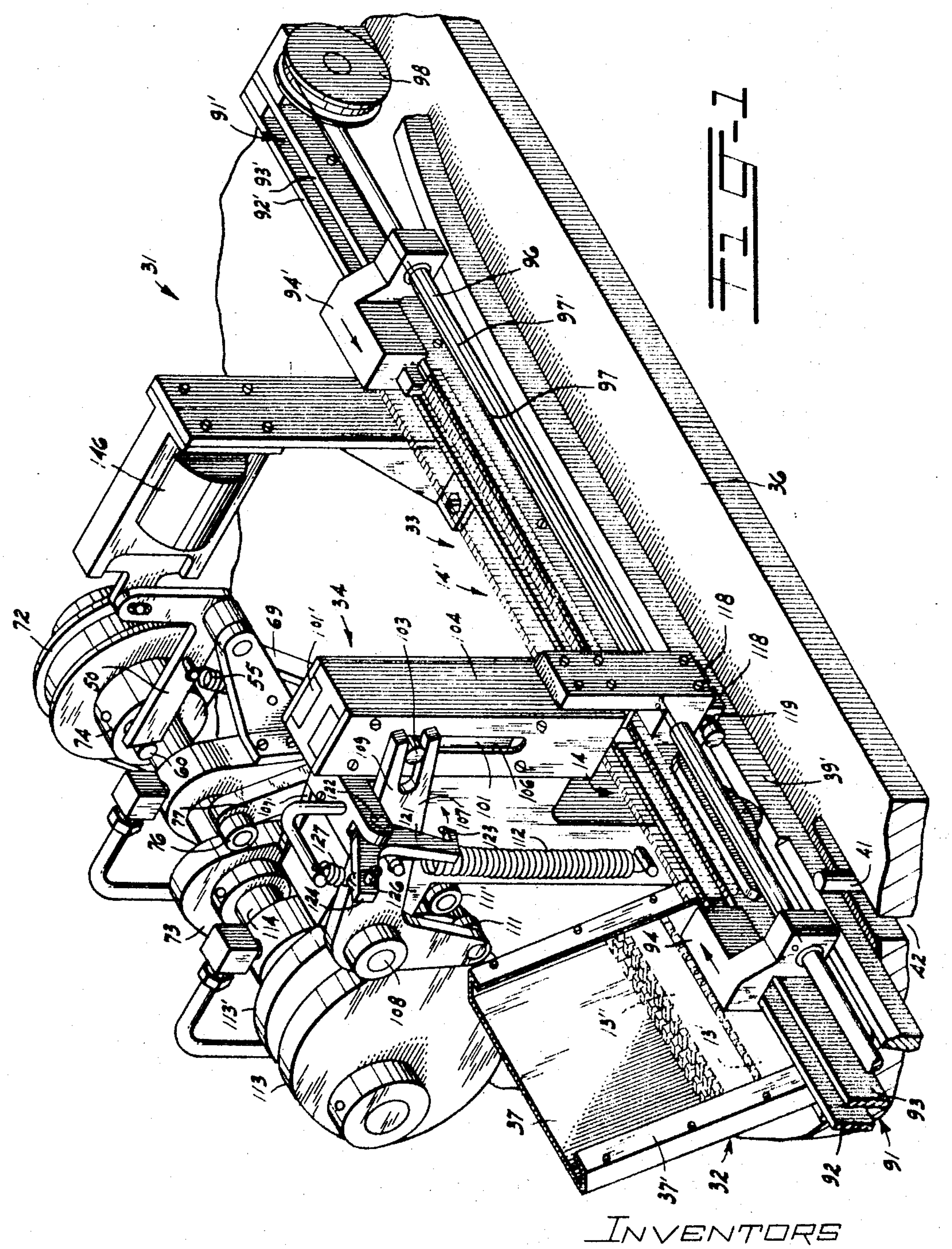
FIG. 1 is a perspective view of an apparatus for inserting terminals into nests in base members in accordance with the principles of the invention.
Figure 2:
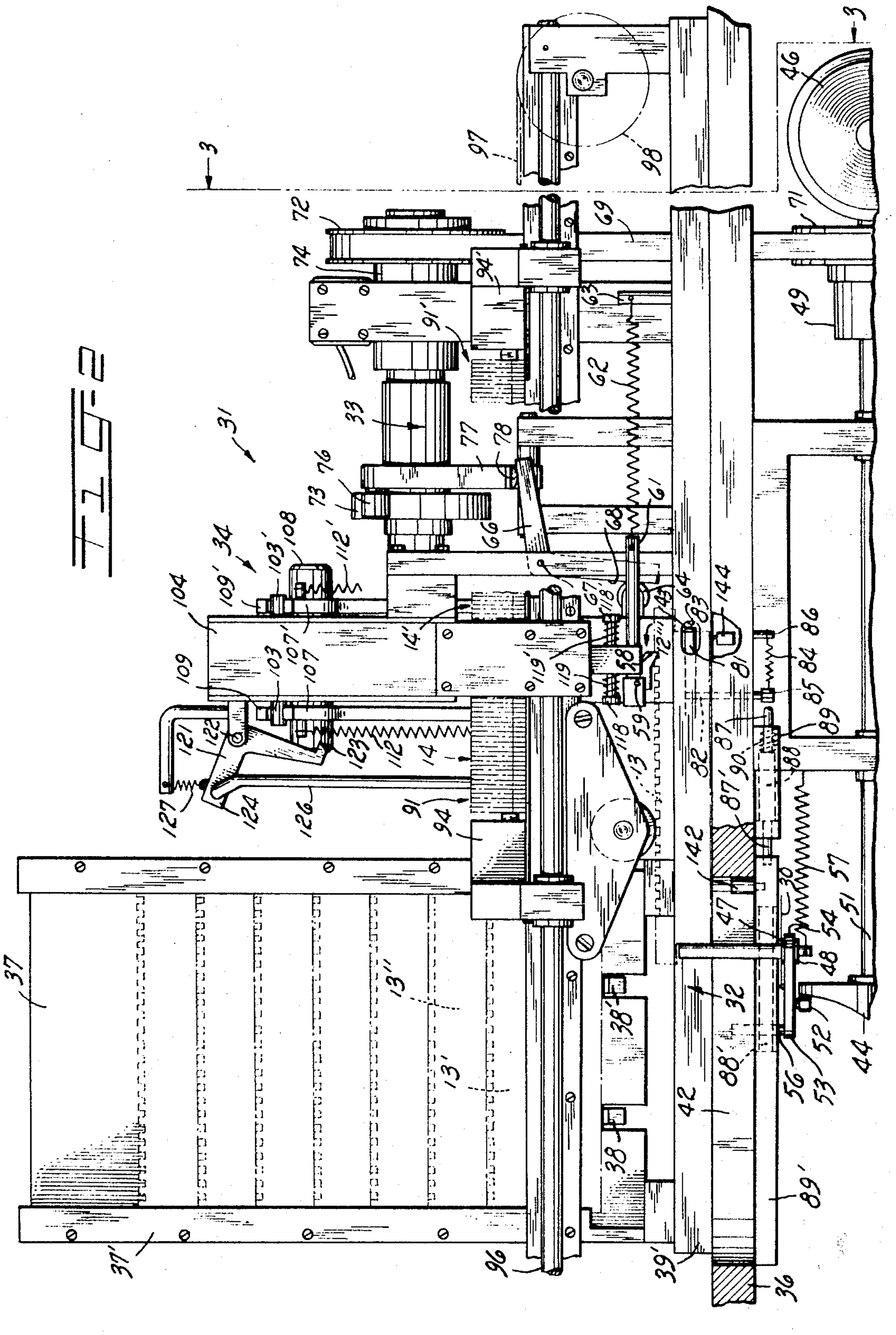
FIG. 2 is a side elevational view of the apparatus of FIG. 1 showing a base member feeding and indexing mechanism, a terminal feeding mechanism, and a pusher or inserting mechanism.
Figure 3:
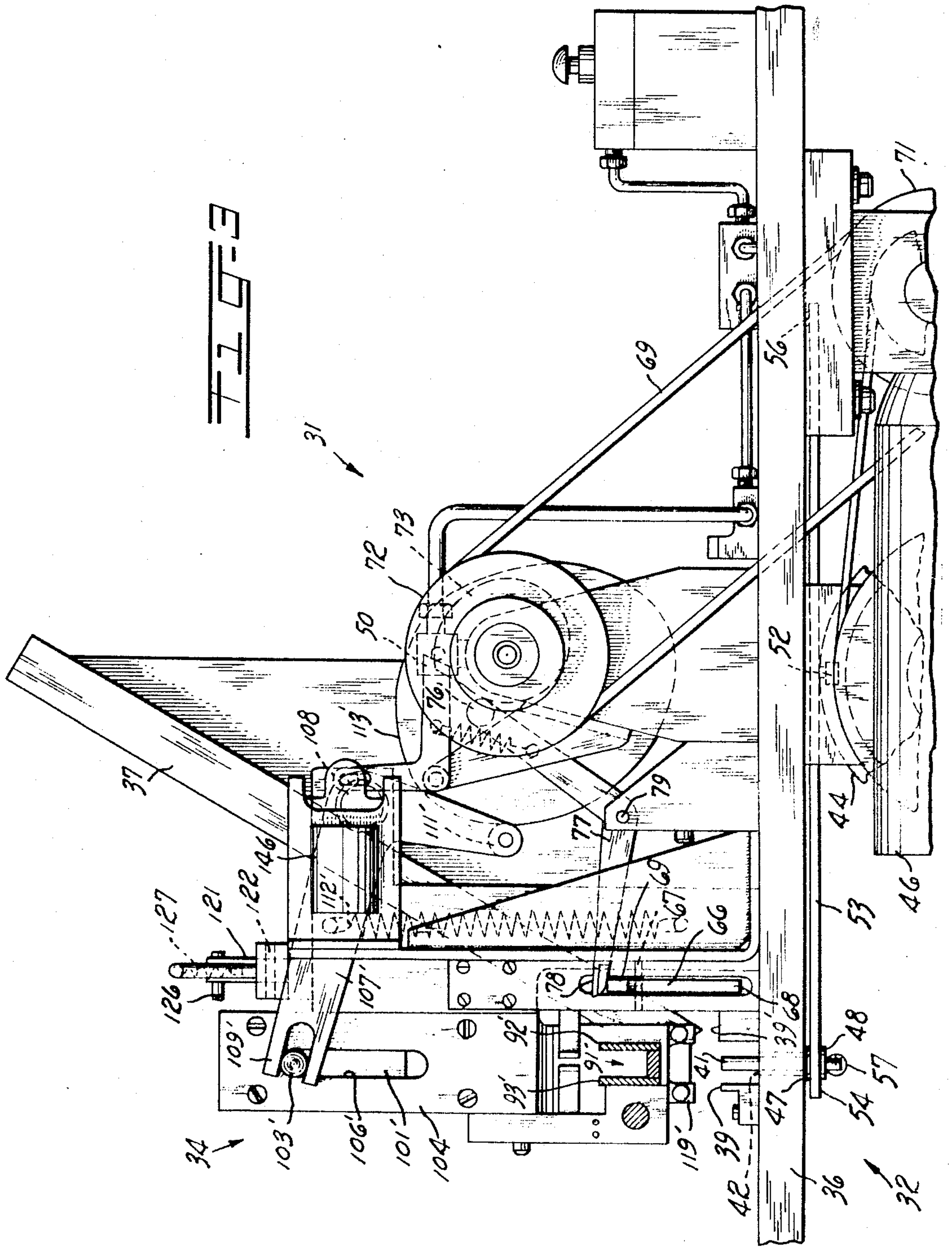
FIG. 3 is an end elevational view of the apparatus of FIGS. 1 and 2, illustrating operation of the base member feeding and indexing mechanism and the pusher mechanism.

An apparatus 31 for inserting the terminals into the base member 13 and other similar base members will now be described. The apparatus is illustrated in FIGS. 1–3 of the drawing. The inserting apparatus 31 includes a base member feeding and indexing mechanism, shown generally at 32, a terminal feeding mechanism, generally at 33, a pusher mechanism, generally at 34, and a support 36 for these mechanisms. In general, base members 13 are incrementally advanced by mechanism 32 along the support 36 into position to receive pairs of terminals 14 by operation of the pusher mechanism 34.

Figure 11:
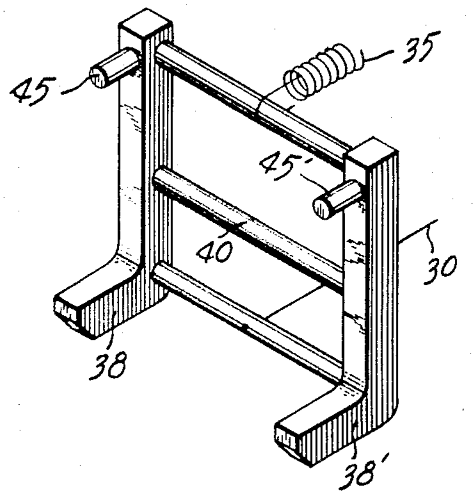
FIG. 11 is a perspective view of a base member magazine escapement mechanism used in the apparatus.

Included in the base member feeding and indexing mechanism 32 is a base member magazine 37. A plurality of base members 13', 13'', etc. may be stored in the magazine 37, to drop therefrom under the influence of gravity when a pair of generally horizontally extending supports 38 and 38' (FIG. 2), forming part of an escapement mechanism (FIG. 11), are momentarily withdrawn. A spring 35 ordinarily biases the supports 38 and 38' pivoted about a cross rod 40 into a base member supporting position. A pull wire or chain 30 is connected to pivot the supports 38 and 38' out of the base member supporting position. A pair of spring-loaded plungers 45 and 45' are positioned to retain the succeeding base member in position as a base member is dropped by the withdrawal of the supports 38 and 38'.

A pair of parallel tracks 39 and 39' (FIG. 3) are positioned beneath the magazine 37 to receive a base member dropping therefrom. A pusher rod 41 extends upwardly through a slot 42 in the support 36. Slot 42 extends parallel to the tracks 39 and 39' to permit longitudinal movement of the rod 41 for contacting a base member held between the tracks and for feeding the base member toward a stop 43 (FIG. 2) located beneath the pusher mechanism 34.

Figure 10:
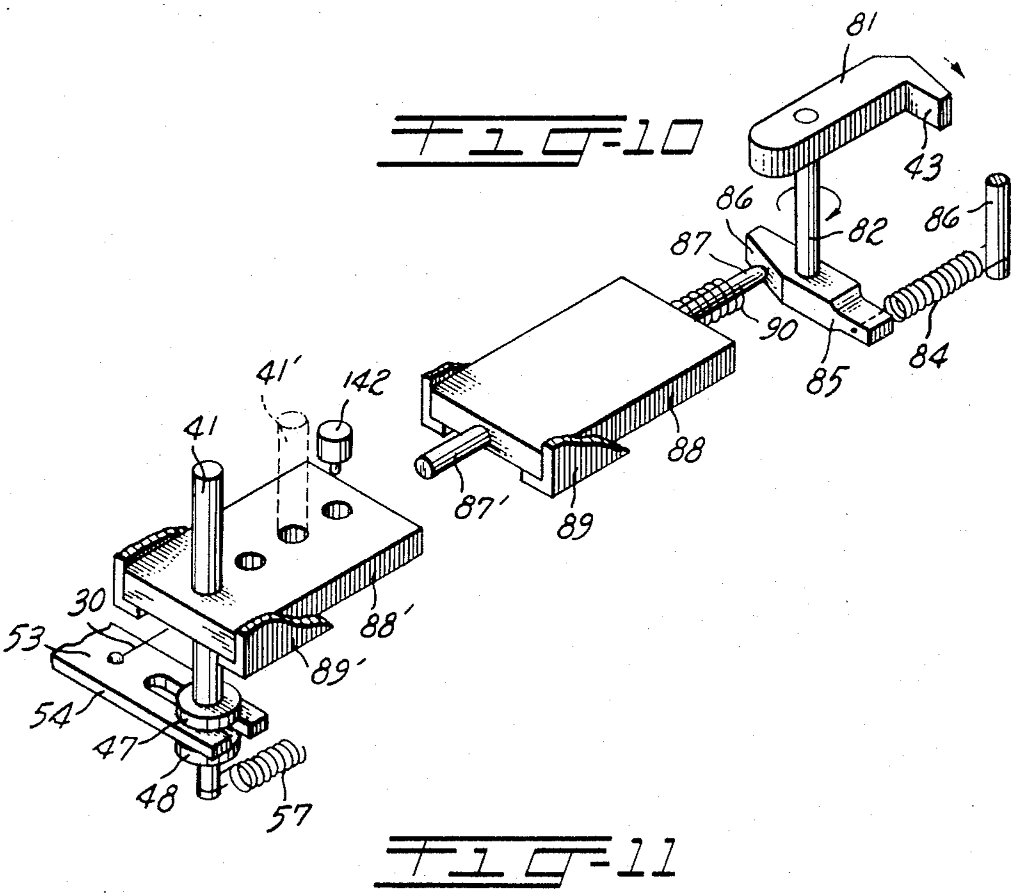
FIG. 10 is a perspective view of a base member stop mechanism used in the apparatus.

A base member feeding face cam 44 (FIGS. 2 and 3) is located beneath the support 36. A motor 46 is connected to rotate the cam through a drive train, including a base member clutch 49 and a shaft 51. The base member clutch 49 is of a conventional single revolution type. A cam follower 52 is mounted on a lever 53 at a point between the rod 41, which is located in a bifurcated end 54 of the lever, and a fixed pivot pin 56 at the other end of the lever. A spring 57 biases the pin 41 toward the stop 43 and also biases the lever 53 pivoted about the pin 56 in a direction to hold the cam follower into contact with the face of the base member feeding cam 44. With this arrangement, rotation of the cam 44 will cause pivotal motion of the lever 53 about the pin 56, the rod 41 moving longitudinally back and forth in the slot 42. The bifurcated end 54 of the lever 53 permits a small degree of relative movement of the rod 41 longitudinal of the lever. Thus, the rod 41 is not constrained to follow an arcuate path and may be reciprocated along the longitudinal slot 42. The rod 41 is slidably mounted in the bifurcated end 54 of the lever 53 between a pair of flanges 47 and 48 on the rod (FIG. 10). The escapement mechanism pull wire or chain 30 is connected to the lever 53 to be pulled to drop a base member each time the lever 53 is moved to drive the rod 41 to its leftmost position in the slot 42 (FIG. 10).

In the position of the apparatus shown in FIG. 2, a base member 13 has just been delivered to the stop 43 by the rod 41 attaining its most forward position in the slot 42. At this moment, a weighted pawl 58, which is pivotally mounted on a pin 59, extends into the first nest 12''' in the base member. The pin 59 is mounted on a slide 61 for reciprocal movement longitudinal of the tracks 39 and 39'. A spring 62 biases the slide 61 forwardly toward a spring post 63. A roller 64 is also mounted on the slide 61 and is located adjacent an L-shaped pivot arm 66 for transferring reciprocating motion to the slide. The pivot arm 66 is supported for oscillating movement about a pin 67. Clockwise movement of the pivot arm 66, as shown in FIG. 2, will move the slide 61 to the left through contact between a downward extending leg 68 of the pivot arm and the roller 64.

The motor 46 also drives a pulley 71, which is connected through a belt 69 to another pulley 72. The pulley 72 drives a base member indexing cam 73 through an insertion clutch 74, FIG. 2. The insertion clutch 74 is of the same single revolution type as the base member clutch 49. An arm 50 is biased by a spring 55 to normally contact a projection 60 on the clutch and maintain the clutch disengaged. An insertion clutch solenoid 146 is connected to pivot the arm 50 away from the projection 60 when energized. So long as the arm 50 is out of contact with the projection, the clutch is engaged and the insertion cam 73 is rotated.

A cam follower 76 is mounted on one end of a rocker arm 77, the other end 78 of which contacts the pivot arm 66 on the other side of the pin 67 from the leg 68. The rocker arm 77 is mounted to pivot about a pin 79 (FIG. 3). The cam is designed to pivot the rocker arm 77 about the pin 79 and the pivot arm 66 about the pin 67 once for each rotation of the cam. The roller 64 thereby reciprocates the slide 61 with the pawl 58 contacting a forward portion of every second nest, to index the base member 13 through a distance corresponding to two nest positions. The stop 43 is ordinarily held withdrawn from a position blocking movement of base member, thereby permitting indexing to occur.

The stop 43 is located at the end of a stop arm 81, best shown in FIG. 10. A shaft 82 projects downwardly from the stop arm 81. The stop arm is mounted at one end of the shaft 82 to pivot as the shaft is oscillated about its axis. Thus, the stop 43 may be moved into a blocking position, wherein it extends through an opening 83 (see FIG. 2) through the track 39' to engage a leading end of a base member 13. This occurs when the shaft 82 is pivoted in a clockwise direction as shown in FIG. 10. However, the shaft 82 is ordinarily held pivoted counterclockwise, under the influence of a spring 84 which biases a lever 85 toward a spring post 86. The bottom end of the shaft 82 mounts the lever 85. The shaft is pivoted clockwise, moving the stop 43 into a blocking position, whenever a bevelled surface 86 on the lever 85 is pushed by a first plunger 87 to move the lever clockwise against the influence of the spring 84. The first plunger 87 projects forwardly from a first slide 88 which reciprocates in a first guide member 89. A second plunger 87' projects rearwardly from the first slide 88 toward a second slide 88' which is mounted for reciprocation in a second guide member 89', driven by the rod 41 reciprocating in the slot 42. At the forwardmost position of the rod 41, the first plunger 87 will be operated to pivot the stop 43 into a blocking position as the second slide 88' is moved forward in contact with the second plunger 87' on the first slide 88. A base member 13 is, thus, accurately positioned beneath the pusher mechanism 34. The plunger 87 is thereafter withdrawn under the influence of a return spring 90 as the second slide 88' is moved rearwardly by the rod 41. The spring 84, meanwhile, causes retraction of the stop 43.

Figure 5:
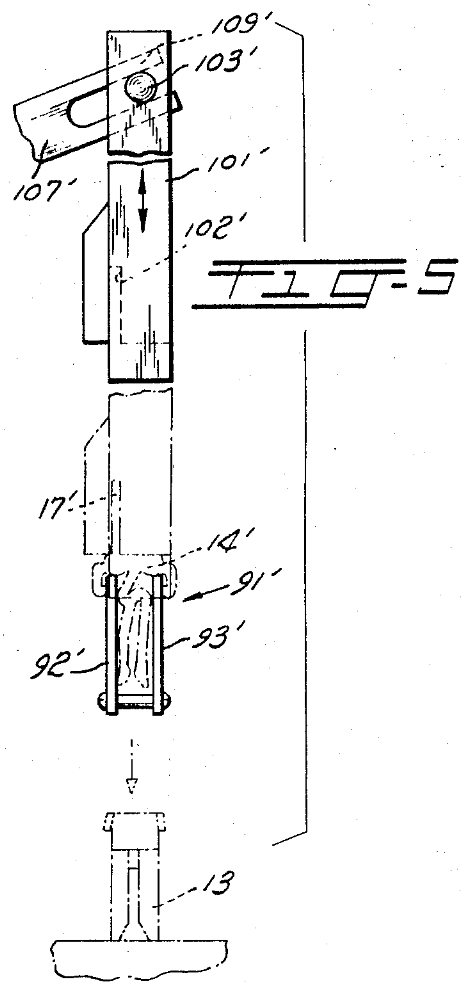
FIG. 5 is an end elevational view of another pusher, operative upon terminals having a different orientation from those used with the pusher of FIG. 4.

Included in the terminal feeding mechanism 33 are a pair of aligned trackways 91 and 91' (FIG. 1) extending generally inwardly each from one end of the support 36 toward the pusher mechanism 34. Each trackway 91 or 91′ is composed of two parallel tracks 92 and 93 or 92′ and 93′. As can best be seen in FIGS. 4 and 5, the trackways are dimensioned so as to allow a group of terminals 14 or 14′ to straddle a trackway 91 or 91′, respectively. The body portion 16 of each terminal 14 rests on the top of the tracks 92 and 93 with the legs 21 and 22 extending downwardly between the tracks and the arms 18 and 19 extending downwardly outside of the tracks. Each terminal 14′ is similarly supported on tracks 92′ and 93′ with an orientation opposed to that of the terminals 14 on tracks 92 and 93. A pair of feeding blocks 94 and 94′ (FIGS. 1 and 2) ride on the trackways 91 and 91′, respectively, as well as on a supporting rod 96 passing through slide bearings in each of the feeding blocks. A pair of wires 97 and 97′ urge the feeding blocks 94 and 94′ inwardly toward the pusher mechanism 34, upon being pulled in any known manner, such as through the use of a pulley 98 and a weight (not shown). Terminals 14 or 14′, located between a feeding block 94 or 94′ and the pusher mechanism 34 are, thus, constantly biased to move toward the pusher mechanism.

Figure 8:
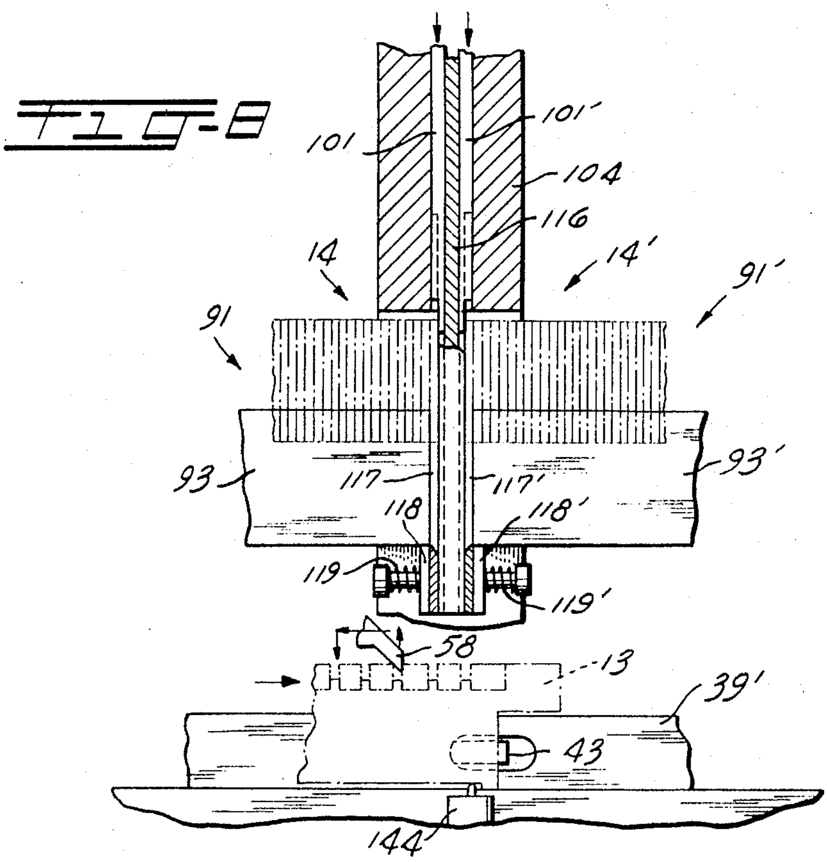
FIG. 8 is a side elevational view, partly in section, illustrating the action of the pushers in inserting terminals into empty nests in base members.
Figure 9:
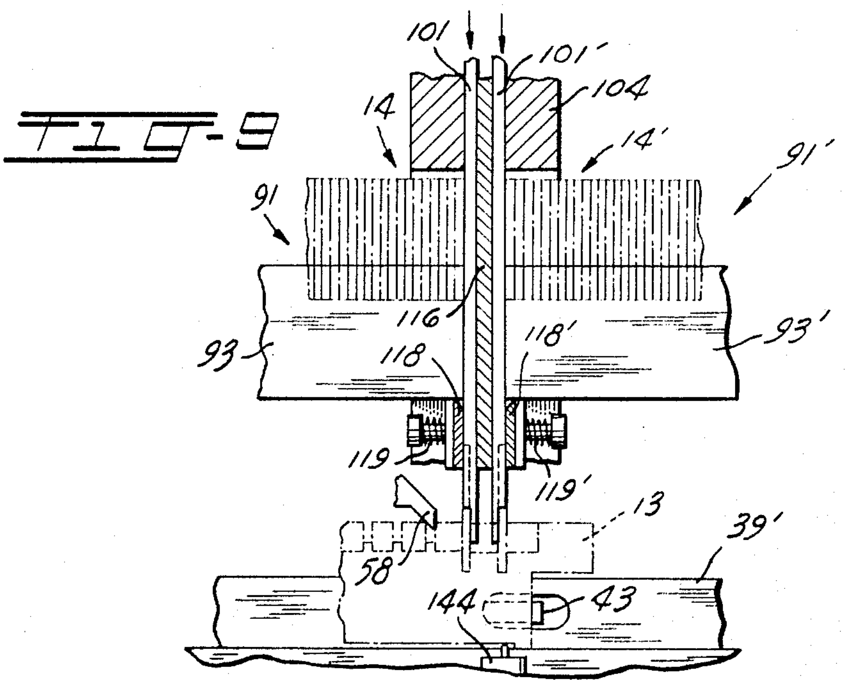
FIG. 9 is a side elevational view, similar to FIG. 8, showing a subsequent stage of insertion.

Included in the pusher mechanism 34 is a pair of pushers or inserts 101 and 101′ (FIGS. 4, 5, 8, 9). The pusher 101 has a slot 102 cut therein into which the head member 17 of a terminal 14 can fit. The pusher 101′ has a similar slot 102′ for the head member 17′ of an oppositely oriented terminal 14′. Each pusher is adapted to push a terminal 14 or 14′ into an inserted position in an aligned nest in base member 13, as indicated by the lower arrows in FIGS. 4 and 5, and as shown in FIGS. 8 and 9. Such insertion occurs while the pawl 58 is located rearward of the nests into which terminals are being inserted. A laterally projecting pin 103 or 103′ (FIGS. 1–5) is located near the upper end of each pusher. A pusher supporting block 104 (FIGS. 1, 3), in which the pushers 101 and 101′ are vertically slidable, has slots 106 and 106′ cut therein through which the pins 103 and 103 project.

A pair of L-shaped pusher actuating arms 107 and 107′ are pivotally mounted on a fixed axle 108. Each actuating arm 107 or 107′ has a bifurcated end 109 or 109′ into which extends the pin 103 or 103′, respectively. The actuating arms, when pivoted about the axle 108, will move the pushers 101 and 101′ vertically, the pins 103 and 103′ remaining within the bifurcations in the arms. A pair of cam followers 111 and 111′ are carried on the other, non-bifurcated ends of the actuating arms 107 and 107′. A pair of springs 112 and 112′ bias each cam follower into engagement with one of a pair of pusher actuating cams 113 and 113′. Alternately, two camming surfaces may be located on a single cam. Springs 112 and 112′ also act to bias the actuating arms 107 and 107′ to drive the pushers 101 and 101′ downwardly when the surface configurations of the cams 113 and 113′ so permit. The cams 113 and 113′ are mounted on a common shaft 114 (FIG. 1) with the block indexing cam 73 so as to be rotated therewith. The clutch 74, thus, controls the rotation of all three cams 73, 113, and 113′.

A central divider or guide plate 116 (FIGS. 8 and 9) passes through the pusher supporting block 104 to separate the pushers 101 and 101′. The divider plate extends downwardly between the inner ends of the terminal feeding trackways 91 and 91′, terminating above the base member tracks 39 and 39′. A pair of gaps 117 and 117′, sufficient in width to each contain one terminal 14 or 14′, are located between the divider plate 116 and the inner ends of the trackways 91 and 91′. At the lower end of each gap, just below the trackways 91 and 91′, are located a pair of spring pads 118 and 118′, biased to restrict the gaps 117 and 117′ adjacent the lower end of the divided plate 116 by springs 119 and 119′. Downward movement of the pushers 101 and 101′ will push a pair of terminals 14 and 14′, each in a gap 117 or 117′, past a spring pad 118 or 118′ as spring 119 and 119′ are compressed, inserting the terminal into an aligned nest in the base member 13.

In order to selectively preclude the insertion of a terminal 14, an L-shaped blocking lever 121 (FIGS. 1–3) is associated with the pusher actuating arm 107. The lever 121 is pivotally mounted on a pin 122 and positioned to move a blocking projection 123 under the actuating arm 107 when the lever is pivoted about the pin 122 in a counterclockwise direction as viewed in FIGS. 1 and 2. A pull rod 126 for pivoting the lever counterclockwise into a blocking position is located at the opposite end 124 of the blocking lever 121 from the blocking projection 123. A spring 127 is also located at the end 124 of the blocking lever 121 for biasing the lever away from the blocking position.

Figure 12:
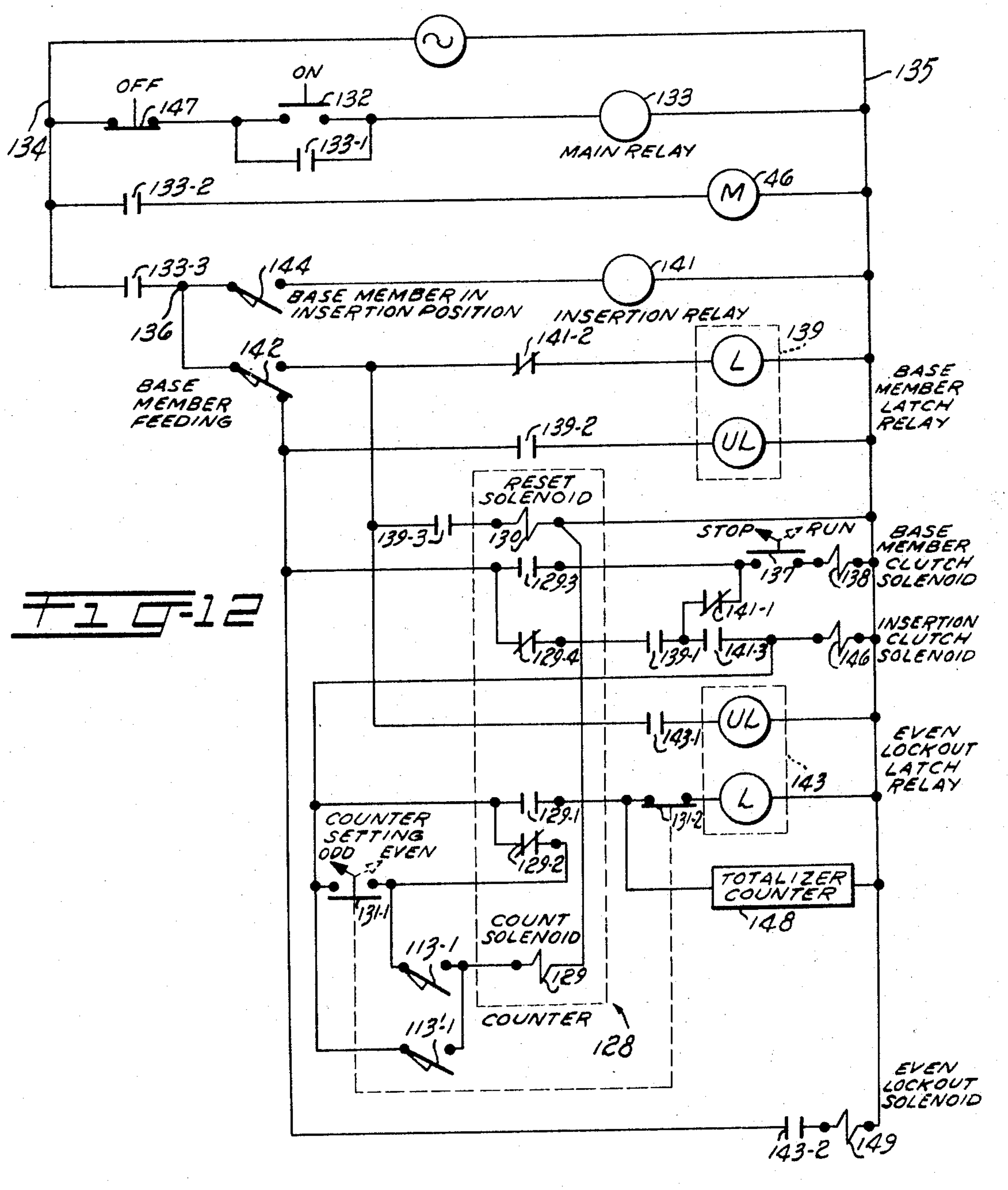
FIG. 12 is a schematic diagram of an electrical control circuit for the apparatus of the invention.

In describing the operation of the apparatus, reference is now also made to FIG. 12 in which an electrical control circuit for the apparatus is schematically illustrated.

Initially, a conventional counter 128 is manually set by turning a pointer on an indicator dial (not shown) to designate a selected number of counts, corresponding to the number of nests 12 in a base member 13 to be filled with termfnals. The counter may be of a type manufacture by the Eagle Signal Company of Davenport, Iowa, designated as the HZ150A601 Cycl-flex Counter. This counter registers each time a count solenoid 129 is momentarily energized. At the selected number of counts less one, a single pole, double throw switch is operated to close normally open contacts at 129–1 and to open normally closed contacts at 129–2. Similarly, when the selected number of counts has been registered, normally open contacts at 129–3 are closed and normally closed contacts at 129–4 are opened. Energization of a reset solenoid 130 will thereafter reset the counter to a condition of zero counts registered, starting a new count of the number of times the count solenoid 129 is momentarily energized and resetting all counter contacts to their normal conditions. Other types of counters may be used, such as a pawl and rachet driven multi-cam device wherein the pawl and ratchet will operate to register each count and the cams will be rotated to open and close the contacts 129–1, 129–2, 129–3, and 129–4. Also, electronic or transistor multi-stage counters may be used to energize the circuits established by the illustrated contacts.

Additionally, a counter setting switch 131–1 is preliminarily set to select an "odd" or "even" position, also corresponding to the number of terminals to be inserted into nests in the base member. The contacts of switch 131–1 are open for an "odd" position selected and closed from an "even" position selected. The contacts of a ganged switch 131–2 are simultaneously closed for an "odd" position selected and open for an "even" position selected.

To start the operation of the apparatus, an "on" switch 132 is depressed by the attending operator to connect a main relay 133 across a pair of busses 134 and 135. The main relay closes normally open contacts at 133–1, 133–2, and 13–3. The closing of the contacts at 133–1 provides power to maintain the main relay 133 energized upon release of the "on" switch. The closing of the contacts at 133–2 energizes the motor 46 (FIGS. 2 and 3). The closing of the contacts at 133–3 provides power to a junction 136.

A run switch 137 is next closed by the attending operator. This energizes a base member clutch solenoid 138 by connecting the solenoid in series to the junction 136 through normally closed contacts at 129–4, 139–1, and 141–1, and a base member feeding switch 142, presently in the position illustrated in FIG. 12. The base member clutch solenoid 138 operates in conventional manner to engage the base member clutch 49 (FIG. 2). Thus, the base member feeding cam 44 begins to rotate, driven by the motor 46 and the associated driven train. The cam follower 52 pivots the lever 53 about the fixed pin 56 and the rod 41 is moved to the left (FIG. 2) in the slot 42.

At the leftmost position of the rod 41 in the slot 42 (FIG. 2), an empty base member 13 is dropped from the magazine 37 onto the tracks 39 and 39′. The base member falls into a position between the rod 41 and the pusher mechanism 34 as the pull wire or chain 30 withdraws the pivotally mounted support 38 and 38' when pulled by the lever 53. The spring-loaded plungers 45 and 45' meanwhile retain the other base members in the magazine 37.

As the base member feeding cam 44 continues to turn, the spring 57 (see FIG. 2) begins to return to the right, feeding the new base member 13 ahead of the rod on the tracks 39 and 39'. The base member feeding switch 142 is positioned to now be depressed by the second slide 88'. This causes the switch 142 to go to the other position from that shown in FIG. 12, i.e. to an "up" position. Thus, the base member clutch solenoid 138 is deenergized. The single revolution type base member clutch 49, however, remains engaged until completion of a full rotation. The base member feeding cam 44 continues to rotate and feeding continues. A base member latch relay 139 is now energized through normally closed contacts at 141–2. The relay 139 opens the contacts 139–1. The relay 139 also closes contacts at 139–2 in a line to the unlatching mechanism of the relay 139 and at 139–3 in a line to the reset count solenoid 130.

The base member 13 thereafter reaches an insertion position supported on the tracks 39 and 39' beneath the pusher mechanism 34 (FIG. 2). A limit switch 144 is thereupon closed by the base member, indicating that it is in the insertion position. An insertion relay 141 (FIG. 12) is thereby energized by closure of switch 144. The contacts at 141–1 and at 141–2 are opened by the relay 141. A pair of normally open contacts at 141–3, in a line to the insertion clutch solenoid 146, are closed by relay 141.

At the same time, the rod 41 drives the second slide 88' (FIG. 2) forwardly, operating the first slide 88 and the plunger 87 (see also FIG. 10) to pivot the stop 43 into a blocking position. The base member is, thus, stopped in the initial insertion position. The base member feeding cam 44 then stops upon disengagement of the base member feeding clutch. The rod 41 has meanwhile been moved toward the left (FIG. 2). The second slide 88' has, therefore, been moved away from the base member feeding switch 142, which returns to the position shown in FIG. 12. The plunger 87 (FIG. 10) is now located withdrawn from the lever 85 and the spring 84 causes the retraction of the stop 43 from a blocking position.

The return of the switch 142 to a "down" position operates the unlatching mechanism of the relay 139 through the closed contacts 139–2. Contacts now close at 139–1 and open at 139–2 and 139–3. The insertion clutch solenoid 146 (see also FIG. 1) is now energized through closed contacts at 133–3, 129–4, 139–1, 141–3, and the switch 142 which is now in the "down" position. The insertion clutch 74 (FIGS. 1, 2) is, thus, engaged. The pusher actuating cams 113 and 113' and the base member indexing cam 73 begin to rotate.

The rotation of the cams 113 and 113' allows the pushers 101 and 101' to reciprocate vertically in the pusher supporting block 104. This movement occurs as the springs 112 and 112' cause an oscillatory pivoting motion of the pusher actuating arms 107 and 107', respectively, about the axle 108 each time a recessed portion of a cam is presented to the associated cam follower. Each downward movement of the pushers 101 and 101' will drive a pair of appropriately oriented terminals 14 and 14' into a pair of empty nests in the base member 13 in alignment with the pushers (FIGS. 8 and 9).

Between downward movements of the pushers 101 and 101', two new empty nests will be aligned with the pushers by the base member indexing two positions to the right (FIG. 8). This indexing occurs as the rotating base member indexing cam 73 (FIGS. 2 and 3) operates the arms 77 and 66 to reciprocate the slide 61, moving the weighted pawl 58 back and forth through a distance equal to that taken up by two nest positions. Rearward movement of the slide causes the pawl 58 to move in the direction of the unbroken arrows in FIG. 8 while pivoting upwardly about the pin 59 (FIG. 2) to clear a pair of nests. A spring-loaded pressure pad (not shown) bears ligthly against the side of the base member 13 to prevent its being dragged rearwardly by the rearwardly moving pawl 58. Insertions occur while the pawl 58 is in a retracted position. Forward movement of the slide 61 then moves the pawl 58 forward. The pawl is now retained in a nest of the base member 13 by its own weight. The base member is moved two nest positions forward, in the direction of the dotted arrow of FIG. 8, by the forwardly moving pawl 57. The switch 144 is, meanwhile, maintained closed by the base member 13, still in an inserting position with empty nests beneath the pushers 101 and 101'.

Each time the pushers 101 and 101' reach the top of their strokes, new terminals 14 and 14' are moved along the trackways 91 and 91' by the weight biased feeding blocks 94 and 94' (FIGS. 1 and 2) into the gaps 117 and 117' (FIG. 8) at either side of the divider plate 116. each terminal 14 or 14' is oriented in the desired manner. Each inserting stroke of the pushers 101 and 101' drives the terminals 14 and 14' past the spring pads 118 and 118' and into a pair of empty nests in the base member 13 aligned with the pushers by the indexing of the base member.

It will now be assumed that an even number of empty nests, say twenty, are present in each base member. Thus, the initial setting of the counter 128 by the manual operator was at "20." Additionally, the counter setting switch 131–1 (FIG. 12) is at the closed, "even" position and the contacts at 131–2 are open.

During every revolution of the pusher actuating cams 113 and 113', each of the cams momentarily closes in associated switch 113–1 or 113'–1 (FIG. 12), representing the "even" and "odd" numbered nests filled by the pushers 101 and 101', respectively. The switch 142 is presently in its depicted position (FIG. 12), while contacts are closed at 133–3, 129–4, 139–1, 141–3, and 131–1. Thus, each revolution of the pair of cams 113 and 113', momentarily closing the switches 113–1 and 113'–1, registers a pair of counts on the count solenoid 129.

During the final operation of the pushers 101 and 101', corresponding to the final two counts on the counter 128, the contacts at 129–2 and 129–4 open and those at 129–1 and 129–3 close. The closing of the contacts at 129–1 has no effect, since the contacts at 131–2 and at 129–2 are now open. The opening of the contacts at 129–4 causes deenergization of the insertion clutch solenoid 146, disengaging the insertion clutch 74 to stop rotation of the pusher actuating cams 113 and 113' and the base member indexing cam 73. The closing of the contacts 129–3 causes energization of the base member clutch solenoid 138, engaging the base member clutch 49 and starting a new base member feeding cycle, as described above.

During the feeding of a new base member into the insertion position, the base member clutch solenoid 138 will be energized through the closed contacts at 129–3 when the switch 142 is in its depicted position (FIG. 12) until the counter 128 is reset. The base member feeding switch 142 will be operated to its "up" position and soon thereafter return to the depicted "down" position during the feeding of the base member. While the switch 142 is still in the "up" position, the filled base member is pushed from the insertion position by an upper rim of the new base member contacting an upper rim of the filled base member. Thus, the switch 144 (see FIG. 2) momentarily opens, as a small gap between base member bottoms is presented to the switch, and then is closed again by the new base member. The insertion relay 141 is, therefore, momentarily deenergized. The contacts at 141–1 and 141–2 momentarily close and those at 141–3 momentarily open. The base member latch relay 139 is energized by the closing of the contacts at 141–2 while the switch 142 is in the "up" position. Unlatching contacts close at 139–2. Contacts open at 139–1 and close at 139–3. The reset solenoid 130 is now energized, resetting the counter 128. The contacts at 129–1 and 129–3 open and those at 129–2 and 129–4 close. The new base member then closes the switch 144, energizing the insertion relay 141 to open the contacts at 141–1 and 141–2 and to close the contacts at 141–3.

The base member feeding switch 142 then returns to its "down" position. The unlatching mechanism of the base member latch relay 139 is energized through the closed contacts at 139–2. The contacts at 139–2 and 139–3 are, therefore, opened and those at 139–1 are closed.

The closing of the contacts at 139–1, 129–4, and 141–3 permits subsequent operation of the insertion clutch solenoid. Thus, insertion of terminals in the new base member begins. Should no new base member have been fed to the insertion position, however, e.g., had the base member magazine 37 been empty, a filled base member would not have been pushed from the insertion position, and the switch 144 would never have opened. The relay 141 would have continued enedgized and the contacts 141–2 would have remained open. Thus, the base member latch relay 139 would not have been energized and the contacts at 139–3 would never have closed. The counter 128 would not have been reset and the contacts at 128–4 would still be open. The contacts at 141–1 would also be open, the closed switch 144 keeping the relay 141 energized. Thus, insertion of terminals into a filled base member would be prevented, since the insertion clutch solenoid 146 would not be energized. Instead, since the contacts at 129–3 would remain closed and the base member clutch solenoid 138 would still be energized, the apparatus would continue to attempt the feeding of a new base member, alerting the operator to remedy the condition.

Assuming, however, the continued feeding of new base members into the insertion position, insertion of terminals into the new base members will continue. The cycle may be repeated upon a plurality of similar base members until the operator turns the run switch 137 to a "stop" position, isolating the base member clutch solenoid 138 from the power source and preventing further base member feeding upon the filling of the nests in a base member then in the insertion position. Alternatively, the operator could depress an "off" button 147, deenergizing the main relay 133 to immediately shut down the entire apparatus. A totalizer counter 148 may be connected between the contacts 129–1 and the bus 135 to register one count for each base member filled with terminals by the apparatus.

Assuming now that the attending operator desires to insert terminals into base members having an odd number of nests, he first turns the run switch 137 to the "stop" position, as explained above. The width of the magazine 37 is adjusted in any conventional manner, if necessary, to retain the new base members therein. For example, locating pins may be inserted into selected holes to appropriately position a side member 37′ of the magazine. The magazine 37 is then refilled with the new base members. A rod 41′ (FIG. 10), performing the base member pushing function of the rod 41, may appropriately be repositioned in the second slide 88′ by passing it through a selected hole therein. The counter 128 is now reset to the new number of nests corresponding to the new base members. The counter switch 131–1 is turned to its "odd" position, thereby opening the contacts 131–1 and closing the contacts at 131–2, which are in a line to an even lockout latch relay 143. The operator then returns the run switch 137 to its closed "run" position, energizing the base member clutch solenoid 138 to feed a base member into the insertion position in the manner described above.

Insertion then takes place in the same manner as has been explained for the base member with an even number of nests therein, until a single nest remains unfilled in the base member. The final, empty nest now is indexed to a position beneath the pusher 101′ and aligned therewith, while the pusher 101 has no nest position in alignment with it. The counter 128 has just operated to close the contacts at 129–1 and to open those at 129–2, since the single pole, double throw switch associated with these contacts is operated at the present count, less one.

The closing of the contacts at 129–1 energizes the even lockout latch relay 143 through the closed contacts at 131–2. The relay 143 closes contacts at 143–1, in a line to the unlatch mechanism of the relay, and at 143–2, in a line to an even lockout solenoid 149. The even lockout solenoid is, therefore, energized, pulling the pull rod 126 (FIG. 2) downwardly to pivot the blocking lever 121 counterclockwise into a blocking position. In this position, the blocking projection 123 (see also FIG. 1) is located beneath the pusher actuating arm 107. The pusher actuating cams 113 and 113′ continue to turn. Recessed surfaces thereof are presented to the followers 111 and 111′. Freed by the cams to pivot clockwise (FIG. 1) about the fixed axle 108, the pusher actuating arms 107 and 107′ are urged to drive the pushers 101 and 101′ downwardly. A terminal 14′ is inserted into the final nest position in the base member by the pusher 101′. The arm 107 is, however, blocked by the blocking projection 123 on lever 121, preventing the insertion of a terminal by the pusher 101 into a portion of the base member not intended as a nest position.

The final insertion is registered on the counter 128 by the closing of the contacts at 113′–1. Since the switch 113–1 is isolated by open contacts at 131–1 and 129–2, the closing of the contacts at 113–1 does not register an additional count. The contacts at 129–3 thereupon close and those at 129–4 open. The insertion clutch solenoid 146 is now deenergized. Instead, the base member clutch solenoid 138 is again energized and the feeding of a new base member begins once more, in the manner described above. During the base member feeding, the unlatch mechanism of the even lockout latch relay 143 is energized through the closed contacts at 143–1 when the base member feeding switch 142 goes to its "up" position. Thus, the contacts at 143–1 and 143–2 are reopened, simultaneously with the resetting of the counter 128.

Again the cycle will continue for identical base members until the "off" button 147 is pressed or the run switch 137 is turned to "stop." The totalizer counter 148 will keep count of the filled base members. The apparatus may be reset, whenever stopped, for inserting terminals into new base members having different numbers of nests therein.

It is to be understood that the above-described apparatus is simply illustrative of one embodiment of the invention. Many modifications may be made without departing from the invention.

What is claimed is:

1. In an apparatus for inserting elements into a base member having slots formed therein to receive said elements, means for holding a plurality of base members, means for holding a plurality of elements, means for successively advancing said base members seriatim from said base members holding means past said element holding means, means rendered effective during movement of said base member past said element holding means for transferring and inserting an element in each slot formed in the base member, means rendered effective following inserting an element in a predetermined slot in said base member for interrupting operation of said transferring and inserting means, and sensing means operated by the advancement of a subsequent base member to position a first slot in alignment with said transferring and inserting means for reinitiating operation of said transferring and inserting means.

2. In an apparatus for inserting terminals into a series of receiving nests formed in a base member, a pair of elongated trackways longitudinally aligned with each other but having their adjacent ends spaced apart, a guide plate interposed between said spaced apart adjacent ends of said trackways to provide a pair of gaps, means for urging supplies of terminals along said trackways toward and against said guide plate to leave a pair of leading terminals abutting said guide plate suspended over said gaps, means for incrementally advancing a base member past said guide plate to successively present pairs of receiving nests to said gaps, a pair of means rendered effective following each advance of said base member for pushing the said pair of leading terminals through said gaps and into said receiving nests, and means rendered effective by a predetermined number of movements of said pushing means for precluding operation of one of said pushing means.

3. Apparatus for inserting terminals into a plurality of nests formed in a base member comprising:

a support for said base member;

means adjacent said support for holding a number of terminals adjacent said base member and aligned with an equal number of nests therein;

a plurality of pushers, equal to said number of held terminals, mounted adjacent said terminal holding means for movement to engage and push said terminals toward said aligned nests;

pusher actuating means for operating said pushers to insert said terminals into said aligned nests;

means rendered effective after each inserting operation of said pusher actuating means for indexing said base member to align empty nests in said base member with said pushers; and blocking means rendered effective after a predetermined number of opeartions of said pusher actuating means for interrupting the operation of one of said pushers.

4. Apparatus for inserting terminals into a plurality of nests in a base member, as set forth in claim 3, wherein said blocking means comprises:

a counter for registering each time said pusher actuating means is operated; and means responsive to a predetermined number of counts by said counter for operating said blocking means.

5. Apparatus for inserting terminals into a plurality of nests in each of a plurality of base members comprising:

a support for said base members;

means adjacent said support for successively holding each terminal aligned with a nest in a base member on said support;

a pusher mounted adjacent said terminal locating means for movement to push and insert each terminal in a nest;

pusher actuating means for cylically operating said pusher to insert each terminal into a nest;

means, operated after each inserting operation of said pusher actuating means, for indexing each base member on said support to position another nest to receive a terminal;

feed means, rendered effective after all the nests in a base member are filled with terminals for advancing said base member along said support and advancing another empty base member into position to receive terminals; and means, rendered effective during operation of said feed means, for precluding operation of said pusher actuating means.

6. Apparatus for inserting terminals into a plurality of nests in each of a plurality of base members, as set forth in claim 5 wherein said precluding means comprises:

a counter for registering each time said pusher is operated to insert a terminal into a nest;

means responsive to a predetermined number of counts by said counter for interrupting said pusher actuating means; and sensing means responsive to the feeding of an empty base member onto said support for interrupting said feed means and rendering operative said pusher actuating means.

7. Apparatus for inserting terminals into a plurality of nests in each of a plurality of base members, as set forth in claim 6, wherein:

said feed means comprises a reciprocable rod for sliding a base member ahead of said rod and means responsive to said predetermined number of counts by said counter for reciprocating said rod; and said sensing means comprising a switch closed by a base member on said support and means responsive to a closing of said switch for stopping said rod reciprocating means and rendering operative said pusher actuating means.

8. In an apparatus for inserting terminals in a base member having a plurality of slotted nests, a trackway, a magazine for holding a supply of base members, an escapment device for releasing the base members to successively drop from the magazine onto the trackway, a stop member movably mounted to be positioned to engage a base member advanced along said trackway, a pusher member mounted for movement along said trackway, means for reciprocating said pusher to move forward and advance a dropped base member and then reverse to a positioin, to engage a subsequent base member dropped from said magazine, means operated by the completion of the forward movement of the pusher for positioning said stop member to engage said advanced base member whereafter reverse movement of the pusher withdraws said stop from engagement with said advanced base member, means operated by the completion of the reverse movement of said pusher for operating said escapement to drop another base member onto said trackway, means for holding a plurality of terminals, means for transferring terminals from said holding means to said base member, means rendered effective following withdrawal of said stop for incrementally advancing said advanced base member relative to said transferring means to receive said terminals, and means actuated upon withdrawal of said stop for initiating operation of said transferring means and said incremental advancing means to insert terminals into each slotted nest advanced past said transferring means.

9. In an apparatus for inserting terminals into a base member having receiving slots, a pair of aligned trackways having their adjacent ends spaced apart, a divider plate mounted between said adjacent ends to provide a pair of gaps between said adjacent ends and said divider plate, means for urging supplies of terminals along said trackways into engagement with said divider plate to position a pair of leading terminals over said gaps, a pair of spring-loaded pressure pads cooperating with said divider plate for engaging and holding terminals advanced through said gaps, a pair of pushers mounted to cyclically advance and move said leading terminals through said gaps and past said pressure pads, means for advancing a base member past said gaps to position said slots to receive each pair of leading terminals advanced past said pressure pads, and means responsive to the insertion of a predetermined number of operations of said pushers for interrupting operation of one pusher while the other continues to operate.

References Cited

UNITED STATES PATENTS

| | | | |
|---|---|---|---|
| 2,357,693 | 9/1944 | Samson | 29—203 |
| 2,684,523 | 7/1954 | Simshauser. | |
| 2,768,429 | 10/1956 | Willis | 29—206 X |
| 3,139,673 | 7/1964 | Zdanis | 29—203 |
| 3,180,014 | 4/1965 | Maximoff et al. | 29—203 |

THOMAS H. EAGER, Primary Examiner

U.S. Cl. X.R.

29—206